Jan. 23, 1968  O. K. HOBBS  3,365,059
APPARATUS FOR CLEANING PEANUTS
Filed Dec. 1, 1964  2 Sheets-Sheet 1
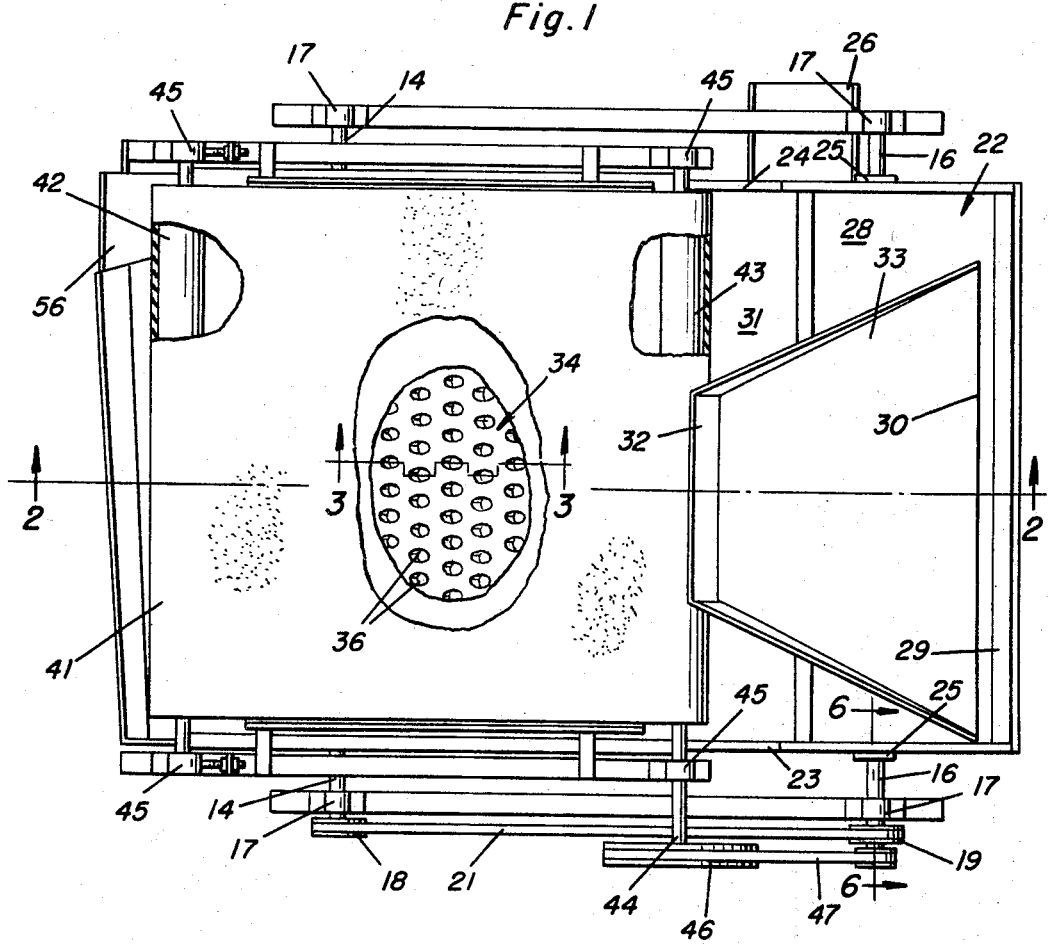
Fig. 1
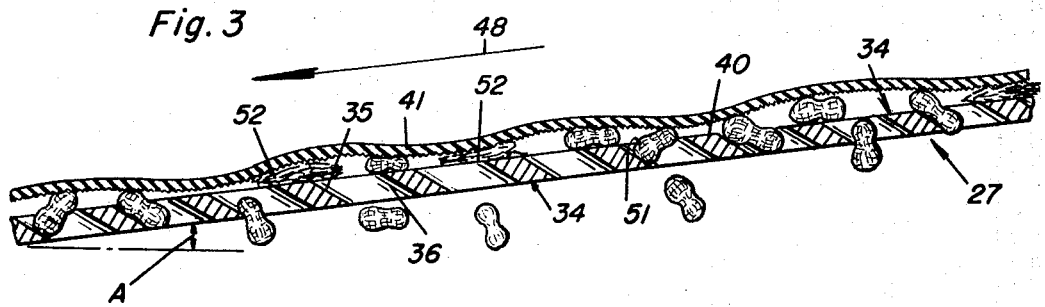
Fig. 3
Fig. 5
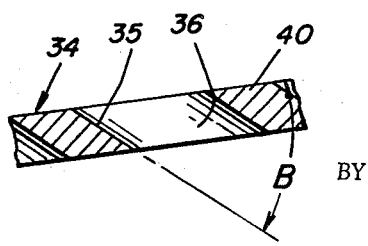
INVENTOR
Oliver K. Hobbs
BY
ATTORNEY Jan. 23, 1968  O. K. HOBBS  3,365,059
APPARATUS FOR CLEANING PEANUTS
Filed Dec. 1, 1964  2 Sheets-Sheet 2
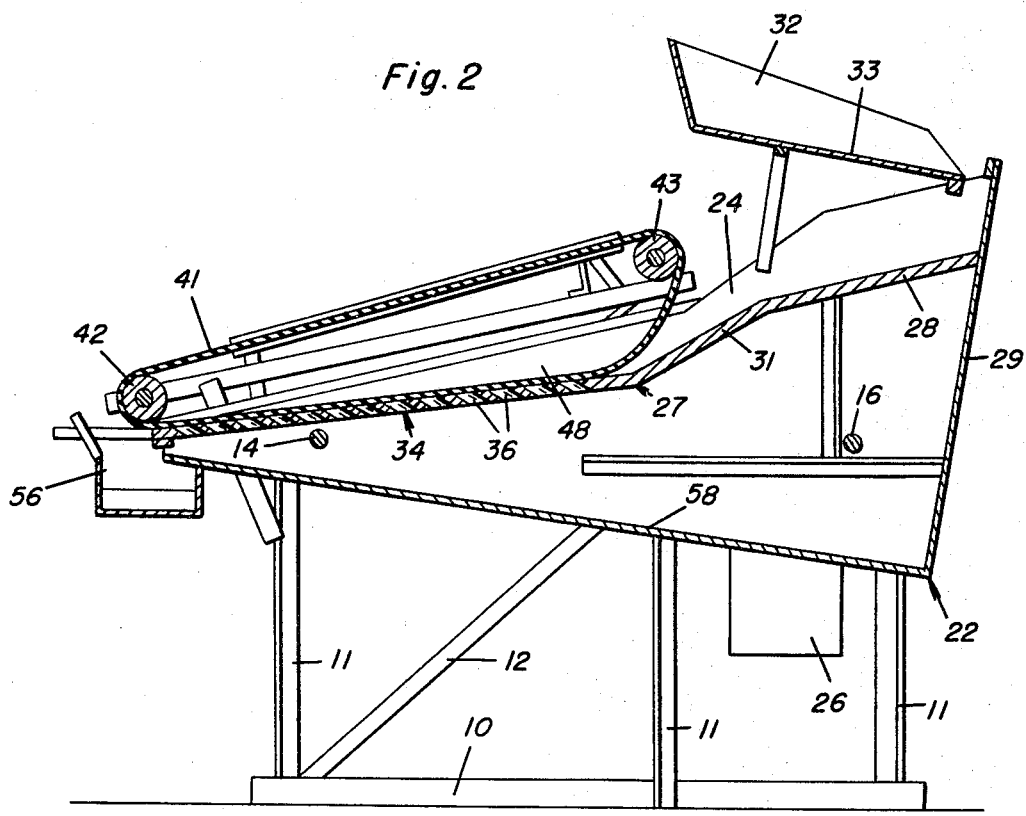
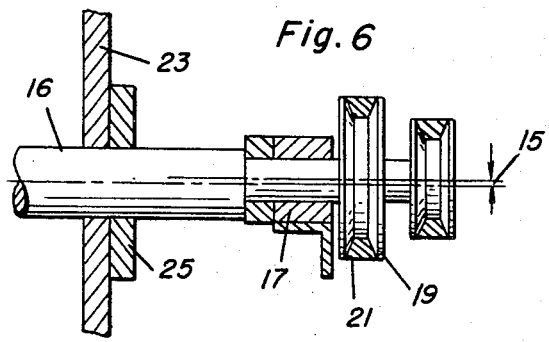
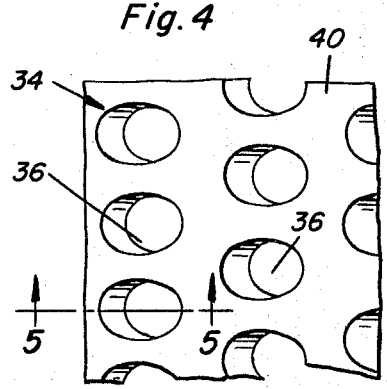
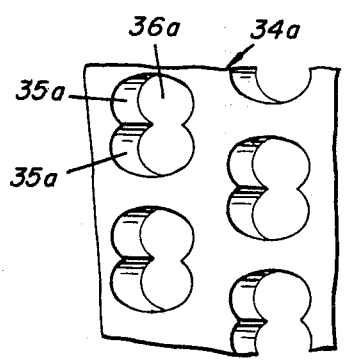
INVENTOR
Oliver K. Hobbs
BY
ATTORNEY

United States Patent Office 3,365,059
Patented Jan. 23, 1968

3,365,059
APPARATUS FOR CLEANING PEANUTS
Oliver K. Hobbs, P.O. Box 1306, Suffolk, Va. 23434
Filed Dec. 1, 1964, Ser. No. 415,065
2 Claims. (Cl. 209—266)

The present invention pertains to classification apparatus for assorting solids and more specifically relates to a machine for separating peanuts in their hulls from trash such as portions of the peanut vines from which the peanuts are detached in a threshing operation.

In the harvesting of peanuts the root portions of the peanut vines with the peanuts attached thereto are removed from the soil. The vines with the peanuts thereon are permitted to dry usually in the field. The peanuts are separated from the vines in a threshing operation which is often carried out by a combine type of machine which separates the peanuts from the vines and such a harvesting machine removes a major portion of the vegetation from the peanuts. Portions of the vines and other trash remain with the peanuts and such vegetation often referred to as haulm is desirably removed from the presence of the peanuts before they are processed in the mills or the like. The present invention pertains to apparatus for separating such trash or debris from the peanuts.

An object of the invention is to provide apparatus wherein the peanuts with the debris mixed therewith are delivered onto an inclined plate where the peanuts and the foreign matter is spread into a substantially single layer after which the peanuts and the trash move over a classification screen and the invention includes means for maintaining the peanuts and the debris as a single layer along the upper surface of the screen with the peanuts moving through openings in the screen while the foreign matter is delivered over the discharge end of the apparatus.

Another object of the invention is to provide a screen for such assorting apparatus wherein the openings are of unique construction which permit the elongated hulls with the peanuts therein to swing and move through openings in the screen while the sticks and portions of the vines are maintained substantially parallel to and on the upper surface of the screen whereby the debris is incapable of moving downwardly through the openings so that the trash is separated from the peanuts and conveyed over the discharge end of the screen.

Other objects and features of the invention will be appreciated and become apparent to those skilled in the art as the present disclosure proceeds and upon consideration of the accompanying drawings taken in conjunction with the following detailed description wherein an embodiment of the invention is disclosed.

In the drawings:

FIG. 1 is a plan view of a peanut cleaning machine embodying the invention with portions of the drag belt broken away.

FIG. 2 is a vertical sectional view taken on the line 2—2 of FIG. 1.

FIG. 3 is an enlarged fragmentary sectional view of a portion of the screen and the drag belt illustrating the manner in which the peanuts are oriented to escape through openings in the screen.

FIG. 4 is an enlarged plan view of a portion of the screen.

FIG. 5 is a fragmentary sectional view taken on the line 5—5 of FIG. 4.

FIG. 6 is a sectional view taken on the line 6—6 of FIG. 1 and showing one of the shafts which supports elements of the mechanism for gyrating movement.

FIG. 7 is a fragmentary plan view of a modified screen structure.

This invention is directed to apparatus for separating peanuts in their hulls from foreign matter and particularly portions of the peanut vines. The peanuts in the uncleaned state are supplied to the apparatus as shown in the annexed drawings wherein a base 10 and a plurality of posts 11 extending upwardly therefrom provide a frame structure for supporting the operative elements of the classification apparatus. The base structure of the frame may take various forms and angularly disposed frame elements such as indicated at 12 may be employed to provide a rigid stationary frame. Substantially all other elements of the apparatus are supported for gyratory movement by two shafts 14 and 16 which are journalled for rotation in bearings 17 supported by the frame structure.

The central portion of the shaft 14 is in the form of a crank arm and the central portion of the shaft 16 provides a crank arm. The eccentric characteristics of the crank portions of the shafts 14 and 16 is of small dimension of about eighty-six thousandths of an inch and this radial displacement from the axis of the bearing portions 17 is indicated at 15 in FIG. 6. The shaft 16 is driven from any suitable power source such as an electric motor and belt (not shown). A pulley 18 is carried by the shaft 14 and a similar pulley 19 is secured to the shaft 16. A belt 21 trained about the pulleys 18 and 19 is of a type to provide synchronous rotation of the shafts 14 and 16 so that the crank arm portions of these shafts rotate in timed relationship.

A trough structure indicated generally at 22 has side walls 23 and 24 which are equipped with bearings 25 for receiving the crank arm portions of the shafts 14 and 15. The trough structure 22 is designed to support other elements of the classification mechanism and to receive the peanuts after they have been separated from the debris. An outlet trough 26 (FIG. 2) carried by the bottom wall of the trough structure 22 provides for conveying the cleaned peanuts to one side of the machine.

A screen structure indicated generally at 27 is mounted on and supported by the trough structure 22. It includes an impervious plate portion 28 which slopes downwardly in proceeding towards the front or tail end of the apparatus from the back wall 29 of the trough structure. Another unapertured plate portion 31 of the screen structure slopes downwardly more steeply than the plate portion 28 as best shown in FIG. 2. A hopper 32 is supported by the trough structure into which the peanuts and the debris is supplied. The bottom wall 33 of the hopper 32 slopes downwardly so as to deliver the peanuts and the debris onto the plate portion 28 adjacent the back wall 29 of the trough structure.

A feature of the machine pertains to the classification portion 34 of the screen structure which extends from the forward end of the plate portion 31 to the front end of the machine. The classification portion 34 is provided with a multitude of openings 36 which are of elliptical shape when viewed in plan as shown in FIGS. 1 and 4. The upper surface of the assorting portion 34 of the screen structure is disposed at an angle to the horizontal at an angle A (FIG. 3) which may vary from about one to seven degrees.

The assorting portion of the screen is relatively thick and the ends of the openings 36 are of arcuate shape throughout the thickness of the screen. The slope of the arcuate surface 35 of each opening 36 in relation to the upper surface 40 is such that the angular surface 35 causes or directs any element moving down the screen portion to be cammed upwardly and onto the surface 40. It has been found that this angle B (FIG. 5) should not be more than forty-five degrees nor less than thirty-eight degrees for best results. The angle B is in part determined by the slope angle A of the classification portion of the screen structure in relation to a horizontal plane. It has been found that an angle of forty-one degrees for the angle B provides desirable results for cleaning peanuts in their hulls and soybeans and for cleaning peanut kernels. The classification portion 34 of the screen has a thickness measured in a direction at right angles to the surface 40 so that the inclined arcuate surfaces 35 within the openings 36 each have a significant length of more than one inch. The elliptical shape of the openings 36 eliminates sharp corners in the openings against which debris may be lodged and which may snag foreign matter. The front end of the screen is supported by the trough structure 22.

Another feature of the classification mechanism pertains to a belt 41 which overlies the screen structure 34. In the embodiment shown in the drawings this belt is of the endless type and trained about rollers 42 and 43 which are journalled for rotation in bearings 45 supported by the frame. The rollers 42 and 43 which support the belt 41 are not subjected to gyratory movement. The belt 41 is of a flexible construction and in one embodiment is formed of rubber. The lower course of the belt 41 in its movement around the rollers 42 and 43 overlies the apertured portion 34 of the screen structure. The shaft 44 of the roller 43 carries a pulley 46 and which is driven by a belt 47 so that the lower course of movement of the drag belt 41 is in the direction of the arrow 48 in FIG. 3.

In operation the peanuts in the uncleaned state having foreign matter and debris mixed therewith are delivered into the hopper 32. The gyratory movement of the trough structure 22 resulting from rotary movement of the crank portions of the shafts 14 and 16 also moves the hopper 32 in gyratory movement whereby the sticks and peanuts escape over the edge 30 of the hopper and are delivered onto the upper rear portion of the plate 28. The plate 28 also gyrates with the trough structure 22 so that the peanuts and the foreign matter spread laterally on the plate 28. Any peanuts and the debris that pile up at the rear end of the plate 28 forms a cushion for peanuts and debris falling from the hopper and such a condition helps to spread the peanuts and the debris over the transverse width of the plate 28. As the peanuts and the debris slide downwardly on the plate portion 31 they accelerate and are arranged as a single layer spread substantially across the width of the screen structure.

As the peanuts leave the plate 31 they are engaged by the drag belt 41. The lower course of the flexible drag belt 41 is not taut and its weight tends to hold the peanuts and the sticks in engagement with the upper surface 40 of the screen structure. As the peanuts and the debris move towards the front end of the apparatus the forward end of a peanut will move downwardly into one of the openings 36 as indicated at 51 in FIG. 3. The lengthwise dimension of the openings 36 measured parallel to the upper surface 40 of the screen structure is slightly greater than that of the peanuts in their hulls. The rear end of the peanut hull will then swing downwardly through the opening 36 and fall into the trough 22. The sloping character of the bottom wall 58 of the trough structure together with its gyratory movement conveys the peanuts into the chute 26 for delivery from the machine.

The haulm as indicated at 52 in FIG. 3 are of greater length than the peanuts. The drag belt 41 maintains the sticks with their lengthwise dimensions along the upper surface 40 of the screen structure 34. If the forward end of a stick should tend to move downwardly into any one of the openings 36 the belt 41 will prevent the rear portion of the stick from rising to any material extent above the surface 40. The forward surface 35 of each opening 36 slopes in such a manner that the front end of the stick is cammed upwardly as the belt 41 moves such debris towards the discharge end of the apertures. The debris is thus carried over the front end of the apparatus and delivered into a trough 56 at the discharge end of the apertures.

The radial displacement of the crank arm for each of the shafts 14 and 16 may vary and when this displacement 15 (FIG. 6) is eighty-six thousandths of an inch the rotating speed of the shafts 14 and 16 may vary from eight hundred to eight hundred seventy-five revolutions per minute. The best results have been obtained at a speed of eight hundred thirty-five to eight hundred forty-five revolutions per minute for the shafts 14 and 16 for peanuts in their hulls and shelled peanuts and for soybeans. Changes in the crank arm displacement and variations in the speed of rotation which provide the gyratory movement may be varied in accordance with the products which are to be cleaned.

The shape of the openings in the classification portion of the screen structure may be varied. Dual elliptical shaped openings 36a may be provided in the screen structure 34a as shown in FIG. 7 with side portions of the openings merging with each other to provide two inclined arcuate end surfaces 35a for each opening 36a. The openings shown in FIG. 7 have been found to be more efficient for some type of produce to be cleaned.

While the invention has been described with reference to particular structural features for the purpose of separating elongated type debris from peanuts in their hulls it will be appreciated that changes may be made in the apparatus and its components. Other types of produce such as soybeans and other elongated products may be separated from debris in accordance with the teachings of the present invention. Other and further changes may be made without departing from the spirit and scope of the invention as set forth in the appended claims.

What I claim and desire to secure by Letters Patent is:

1. In apparatus for separating peanuts in their hulls from elongated trash elements, a trough structure, a screen structure supported on said trough structure sloping downwardly from a receiving end, said screen structure having an impervious portion at the receiving end and a classification portion therebelow, a frame, a horizontally disposed shaft journalled for rotation on said frame, another horizontally disposed shaft spaced from the first shaft and journalled for rotation on said frame, a crank portion on each shaft, bearings carried by the trough structure in which the respective crank portions rotate, means driving said shafts to rotate the crank portion of one shaft in synchronism with the crank portion of the other shaft whereby said trough structure and the screen structure move in a gyratory path, a horizontally disposed roller journalled for rotation on said frame above the plane of said screen structure, a second horizontally disposed roller spaced from the first roller journalled for rotation on said frame above the plane of said screen structure, a flexible belt trained about said rollers with its lower course untensioned over said classification portion and adapted to engage said upper surface in the absence of peanuts or trash thereon, means transmitting movement from said driving means to one of said rollers to drive the belt with its lower course moving towards the tail end of said classification portion, the driving means for said shafts rotating both of said shafts in directions to move the screen structure opposite to the movement of the lower course of the belt during the upper arc of gyratory movement of the screen structure, said classification portion having openings therethrough which are elongated in the direction of movement of the lower course of the belt at the upper surface of the classification portion, an arcuate upwardly facing surface defining the downstream end of each opening below said upper surface, said arcuate surface being inclined at an acute angle with respect to said upper surface, and said impervious portion of the screen structure adjacent the upstream end of the classification portion sloping downwardly more steeply than other parts of the impervious portion.

2. In apparatus for separating peanuts in their hulls from elongated trash elements, a screen structure sloping downwardly from its receiving end, said screen structure having an impervious portion adjacent the receiving end and a classification portion therebelow, an endless flexible belt supported for movement in a loop-shaped path above said classification portion with a lower course of the belt adapted to lie on the upper surface of the classification portion in the absence of peanuts or trash thereon, said lower course of the belt being untensioned so that it may flex upwardly from said upper surface, means driving said belt in a direction with the lower course thereof moving towards the tail end of the screen structure, means supporting and moving the screen structure bodily in a closed arcuate path about a substantially horizontal axis with the upper surface of said classification portion moving in a direction opposite to the movement of the lower course of said belt as the screen structure moves through its upper arc of movement, said classification portion having openings therethrough with dimensions for peanuts in their hulls to move downwardly therethrough, arcuate upwardly inclined surfaces forming the downstream ends of each opening arranged at an acute angle with respect to the upper surface of the classification portion, and said openings being of duel elliptical shape.

References Cited

UNITED STATES PATENTS

| 186,041 | 1/1877 | Montague | 209—266 |
| 195,211 | 9/1877 | Gathmann | 209—266 |
| 253,547 | 2/1882 | McNeal | 209—266 |
| 389,002 | 9/1888 | Owens | 209—266 |
| 466,243 | 12/1891 | Kelly | 209—266 |
| 1,981,081 | 11/1934 | Simpson | 209—266 |
| 2,354,377 | 7/1944 | Johnson | 209—266 |

FOREIGN PATENTS 1,060   5/1855   Great Britain.

HARRY B. THORNTON, *Primary Examiner.*

R. HALPER, *Assistant Examiner.*